United States Patent [19]

von Borstel et al.

[11] Patent Number: 5,351,263
[45] Date of Patent: Sep. 27, 1994

[54] APPARATUS FOR A POWER LASER INCLUDING SOLID OPTICAL BENCH

[76] Inventors: Michael von Borstel, Burenstr. 26, 70435 Stuttgart; Michael Häcker, Sonnenweg 5, 71299 Wimsheim; Heinz J. Prokop, Am Rehbaum 18, 46282 Dorsten; Reinhard Wollermann-Windgasse, Tannenweg 3, 75433 Maulbronn, all of Fed. Rep. of Germany

[21] Appl. No.: 86,633

[22] Filed: Jul. 1, 1993

[51] Int. Cl.⁵ .............................. H01S 3/08; H01S 3/00
[52] U.S. Cl. ................................... 372/107; 372/92; 372/94; 372/99; 372/108; 372/109
[58] Field of Search ..................... 372/34, 36, 55, 58, 372/59, 61, 63, 64, 65, 92, 93, 94, 98, 99, 107, 108, 109

[56] References Cited

U.S. PATENT DOCUMENTS

| | | | |
|---|---|---|---|
| 3,982,204 | 9/1976 | Andringa | 372/61 X |
| 4,245,195 | 1/1981 | Fahlen et al. | 372/58 X |
| 4,464,763 | 8/1984 | Mohler | 372/107 |
| 4,481,635 | 11/1984 | Broberg et al. | 372/94 |
| 4,500,996 | 2/1985 | Sasnett et al. | 372/61 X |
| 4,757,511 | 7/1988 | Klingel et al. | 372/61 X |
| 4,769,824 | 9/1988 | Seki | 372/65 X |
| 4,866,726 | 9/1989 | Ortiz et al. | 372/65 |
| 4,878,227 | 10/1989 | Ackermann et al. | 372/65 X |
| 4,993,040 | 2/1991 | Esskuchen et al. | 372/94 |
| 5,020,070 | 5/1991 | Lombardo | 372/65 |
| 5,052,010 | 9/1991 | Blumentritt et al. | 372/65 |

Primary Examiner—Brian Healy

[57] ABSTRACT

Known power lasers have outstanding electrical, optical and mechanical properties, in spite of different temperature conditions during switching on and during operation. However, they are expensive. These properties are retained, despite cheaper production costs in that, starting from a solid monolithic optical bench, several mirror blocks and intermediate blocks are mechanically rigidly connected to this, and are shaped such that they do not deflect during chip-removing machining, and those bores necessary for the laser path are only then provided.

43 Claims, 8 Drawing Sheets

APPARATUS FOR A POWER LASER INCLUDING SOLID OPTICAL BENCH

BACKGROUND OF THE INVENTION

1. Relevant Prior Art

Such lasers are for example described in the Applicant's DE-OS [German Laid-Open Patents] 3,734,570 and 4,029,187. These lasers have a square shape. However, they can have a rectangular shape or, in principle, be arranged as a triangle, as shown in U.S. Pat. No. 4,993,040. Furthermore, U-shaped arrangements are also possible.

Figure 9:
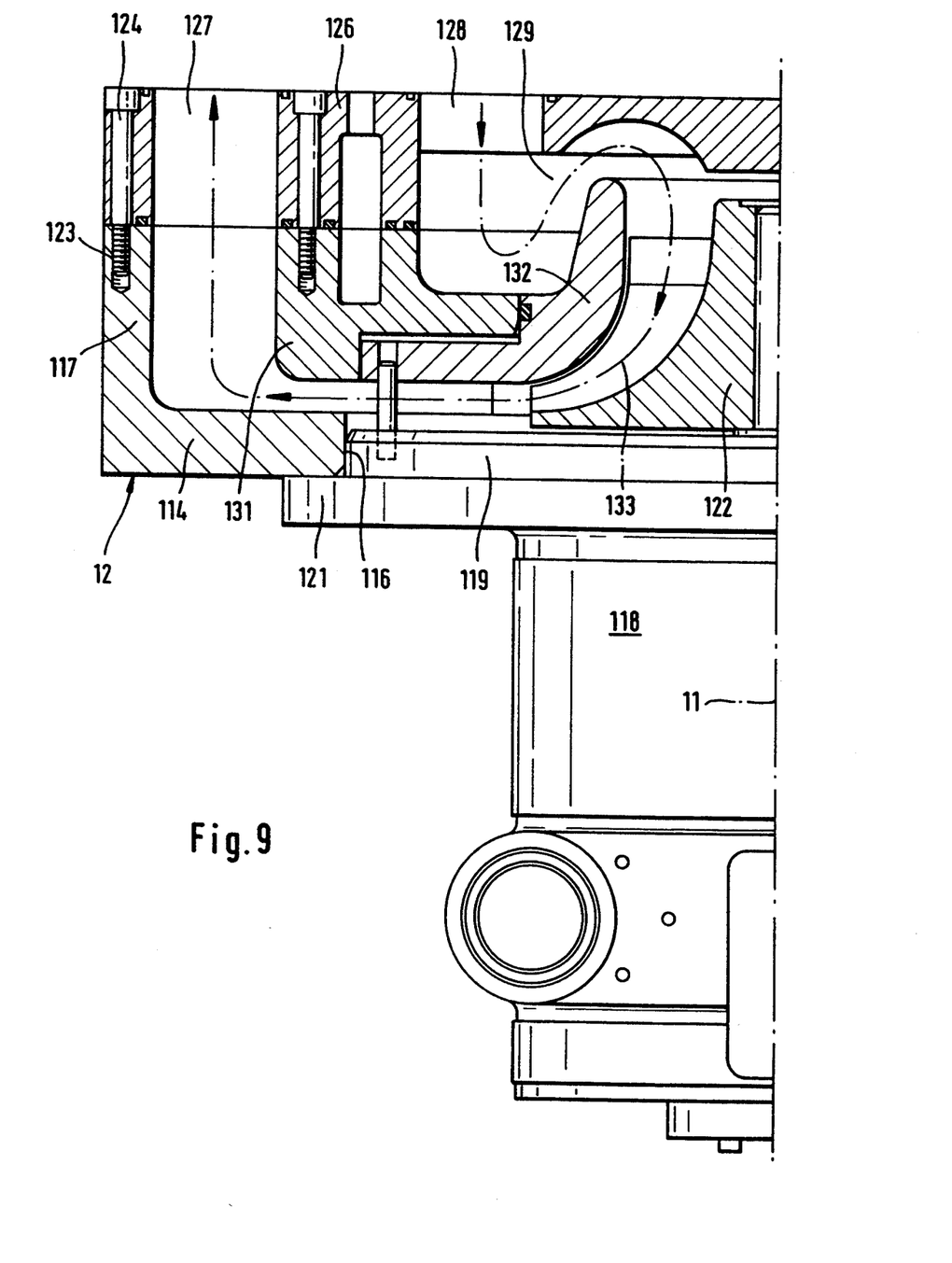
FIG. 9 shows a partially radially cut view of a partial region of the flange, with attached fan and gas conduits.

FIG. 9 of DE-OS 4,029,187 describes a power laser of polygonal configuration with mirror blocks in the corner regions, which mirror blocks have an essentially monolithic body, and intermediate blocks in the straight paths between the mirror blocks, which intermediate blocks have an essentially monolithic body. At least one straight partial bore is in each mirror block. A respective through bore is in each intermediate block. The mirror blocks and the intermediate blocks are fine-machined for the gas-tight and centered mounting of laser tubes. And an optical bench having corresponding corners carries the mirror blocks and the intermediate blocks on its periphery. The problem is common to all lasers of this kind that they will be switched on and off, even in succession, like a normal machine. The laser according to DE-OS 4,029,187 has very many outstanding properties. The mode of the laser beam is time stable and practically does not change during operation. However, the optical bench, constructed as a framework of special steels, has to be welded together. The framework struts are hollow and therefore costly to join together by welding. The whole optical bench is filled with water, which must be kept very constant in a large volume. Care must therefore be taken that the same temperature is present at all places of the optical bench, at least in the water. This requires the expense of flow technological means, because the water flows along the path of least resistance if no special precautions are taken. Joint surfaces are required between the optical bench and the blocks—whether they are mirror blocks or intermediate blocks—and have to be machined with high accuracy and also have to have a highly accurate spatial orientation. A joint surface on the optical bench and one on the block are respectively provided. These must then be secured by locating pins. Only on completion of this can it be seen whether everything is really fitted and seated properly.

SUMMARY OF THE INVENTION

The object of the invention is to provide a way, preferably for turbofan lasers or similar gas circulation pumps, in which such lasers can be produced more cheaply, but with at least the same precision, as heretofore.

This object is achieved according to the invention by the following features: (a) The optical bench is solid and monolithic, (b) The mirror blocks and intermediate blocks are at least in their majority connected in the mechanically rigid manner to the optical bench, so that they do not permanently deform relative to the bench during chip-removing machining processes, at least during fine machining processes on the mirror blocks. Such apparatuses can be produced comparatively cheaply in machining centers, without the symmetry of the geometry present in the known lasers having to be sacrificed. Many previous operations are unnecessary. A solid monolithic mass is, so to speak, its own coordinate system during machining. Weld seams, with their tendency to distort, are unnecessary. It is also not necessary to pay attention to the way in which framework struts behave under diverse operating conditions.

The described embodiments include the following additional advantageous features:

The apparatus could indeed also be cast as such, at least partially, in the correct shape. When the optical bench is machined from a solid block, casting problems do not play a part, and all the surfaces and measurements are under control. Moreover, vacuum-tightness is very important for such apparatuses, but cannot be guaranteed when the apparatus is, for example, produced by precision casting.

When the optical bench is made of an aluminum alloy, the apparatus is of a material which is both relatively cheap and also relatively easy to machine, and conducts heat relatively well. The material also remains stable in shape over a long time, and in particular when starting from hot-rolled, thick plates, which have preferably also been processed so that they are already stress-free.

When the alloy is resistant to sea water, there are no problems in the cooling circuit.

The optical bench may be made of brass; however, brass is more expensive and also heavier. As regards machining, more difficulties arise, since it is also tougher than aluminum.

The optical bench may be made of concrete polymer. In this respect Zerodur could however also be used, a glass material which has practically no thermal expansion, but entails difficulties in machining.

At least one of the blocks may be machined from the solid together with the bench. At least one of the blocks has a rigid geometrical coordination with the bench. The most important could be selected here, such as, for example, the output block, which is likewise a mirror block, or the mirror blocks which deflect through 45° or the like.

The mirror blocks may be machined from the solid together with the bench. This ensures that the laser beam can then later be correctly reflected and output.

The intermediate blocks also may be machined from the solid together with the bench. This ensures that even the intermediate blocks maintain their rigid geometrical position relative to the bench and also provides the precondition such that mirror blocks and intermediate blocks can be drilled together in the machining center in practically the same clamping position.

At least a few of the blocks may be at least of essentially the same height as the thickness of the bench. This ensures that the blocks are anchored to the bench over their whole height, which means a considerable security against tilting. Moreover the end faces of the blocks and likewise the reference faces are then together with the upper and lower sides of the optical bench. Several such apparatuses could then even be layered one above another and connected together over large surfaces.

The laser segment is parallel to, and offset from the midplane of the apparatus by the same measurement as is necessary to give sufficient surrounding material for one of two mirror fastening threads in the mirror blocks. As a result, the situation in the 45° mirror blocks is improved in the following respects. These are known to have a very large bore to receive the mirror device proper. This large surface, together with the reduced pressure within the laser path, also gives rise to large forces which have to be taken up by the three mirror fastening screws. Up to now, one of the screws and its threads was loaded considerably more heavily than the two others. However, in this manner quite uniform loading of the screws is achieved, in that the screw triangle is made isosceles, and the center of gravity of the force due to the reduced pressure is placed in the middle of the 45° mirror.

The thread may be the inner thread of a pressed-in threaded bushing which is of a harder and/or tougher material than the mirror block material. This is particularly recommended where aluminum is the material used for the apparatus, since although the nuts consisting of steel indeed have to be moved in and out, the thread would then be of aluminum.

At least a few of the blocks are of at least essentially the same material as the bench. The machining techniques are thus simplified; the mechanical behavior becomes more controllable, as is the thermal behavior, and it is not necessary to use materials which indeed are monolithic but however have other properties in the block region.

The partial bores and the through bores may be first drilled together, with a dimension smaller than specified. As a result, the bores are already aligned in the stage of first drilling a smaller hole, and the reference measurements can then be more easily maintained during further work steps.

The partial bores and the end bores may be drilled out together. As a result, even in an intermediate stage the geometrical long axis of these bores is a common one, which has consequences for the result of later machining processes.

The partial bore and the through bores may be fine-machined, especially reamed, in the same apparatus clamping position. As a result, upon completion the partial bores and through bores are aligned with high accuracy, and furthermore at a low machining cost.

The partial bores and through bores may be fine machined only in the end region, essentially where the sealing device of the mounting has its sealing face. As a result, the expensive machining is limited to such regions as are decisive for vacuum-tightness.

The partial bores and the end bores may be fine machined with a step reamer. Still better precision is achieved than when one reamer would have been used for the through bore and a further one for the partial bores. Moreover, clamping time is then saved.

The through bores may have a smaller diameter than the partial bores, at least after the fine machining processes. Everything which would damage the wall of the partial bores during withdrawal of the tool from the bores is avoided thereby.

Each half of the through bores may be machined out from the adjacent partial bore. Machining can also take place in machining centers which are not capable of that tool stroke which would be possible with deep hole drilling machines. However, if the money is invested in deep hole drilling machines, at least the largest part of the drilling work between two mirror blocks could be machined in a single pass.

The intermediate blocks may be connected with at least one bottom strip to the optical bench, which bottom strip has a substantially smaller cross section than the intermediate block at the face seen in the direction of the midplane, and that at least one cooling device is provided in the heat transfer region between the bottom strip and the bench. This ensures that the intermediate blocks remain connected to the bench, but are uncoupled to a certain extent as regards heat transfer.

A cooling bore may be provided in the bottom strip itself. Still less heat is given off to the bench as a result.

A cooling bore arrangement may be provided in the region of the transition from the bottom strip to the optical bench. To the extent that heat reaches the optical bench, it is largely withdrawn again.

The cooling bore arrangement may include several parallel individual bores. A heat barrier (cooling wall) extending across the width can be created and nevertheless only by drilling, which is simpler than to work, e.g., a mortise miller.

The individual bores may be connected to a common distributor volume. The supply and drainage problem for the individual bores is simplified.

The individual bores may have different diameters, to improve of the equalization of the flow resistance paths. Equal heat removal over a wide front can be approached.

Notches which increase the heat transfer to the optical bench may be located on both sides of the intermediate blocks. Each intermediate block is further uncoupled as regards heat.

A cooling fan flange for a coaxial cooling fan (gas circulation appliance) may be inscribed in the bench, and that weight-rigid elastic coupling elements are provided between the bench and the flange. The apparatus becomes a single unit, even up to the cooling fan flange also, as regards the cooling fan, and can correspondingly be produced in a machining center without further mounting and at a favorable cost. Thermal phenomena from the bench to the flange or from the flange to the bench are thereby minimized.

The coupling elements may be springs which are substantially weaker in the direction parallel to the mid-plane than perpendicular thereto. Motions of the individual parts in the plane of the bench can be warded off, but relatively large forces perpendicular to the bench are taken up.

The coupling elements may be leaf springs, which meet these requirements.

The number of coupling elements may correspond to the number of corners. This provides a sufficient number of coupling elements, which can remain symmetrical and nevertheless uncouple both thermally and mechanically over wide regions.

Four coupling elements may be provided.

The coupling elements may lie in the region of the diametral connecting line of the mirror blocks, which provides a contribution to mechanical, thermal, etc., symmetry.

The ends of the Coupling elements may be connected to the optical bench. The whole length of the coupling elements can be made use of.

The middle regions of the coupling elements may be connected to the flange. As a result, the coupling elements are stressed in the middle, which meets the controllability of the conditions. A single connection in the middle region moreover improves the uncoupling conditions in the sense mentioned above.

The coupling elements may be machined out integrally from the material between the bench and the flange. Thus, mounting work is avoided, joints are avoided, this region is also made monolithic, and the bench can be made use of as a coordinate system for machining in these regions also.

The coupling elements may extend concentric to a geometric axis which is perpendicular to the geometric midplane and intersects the diagonals between the mirror blocks. This furthers the advantages deriving from a monolithic structure. Space does not first have to be provided for the coupling elements in order to then provide them in the correct position. Rather, the coupling elements correctly assume their position after the machining.

The flange may be separated from the bench by an annular groove, with the exception of the regions determined by the coupling elements. As a result, each coupling element behaves equally with regard to the geometrical axis and can, in a particularly favorable manner, take up such forces which arise parallel to the midplane; furthermore, a practically ideal separation is realized between the flange and the bench, and this in a simple manner in a form which is easy to produce, provided that the annular groove is circular.

The coupling elements may be arranged centrally to the geometric midplane. This ensures that the coupling elements are hardly, or not at all, stressed towards tilting.

The mirror blocks and/or intermediate blocks and/or optical bench may be machined out of a coherent large piece.

The laser path may lie essentially in the midplane of the apparatus.

The end region of a partial bore may be produced with at least the following end region of the following through bore at least during the fine machining in the same apparatus clamping position.

BRIEF DESCRIPTION OF THE DRAWINGS

The invention will now be described with reference to a preferred embodiment.

FIGS. 1(a,b) shows a top views of the arrangement (from inside to outside): flange/coupling element/optical bench/blocks, partially cut away;

FIGS. 3(a,b) shows the bottom views FIG. 1;

DETAILED DESCRIPTION OF A PREFERRED EMBODIMENT

Figures 1, 1A, 1B:
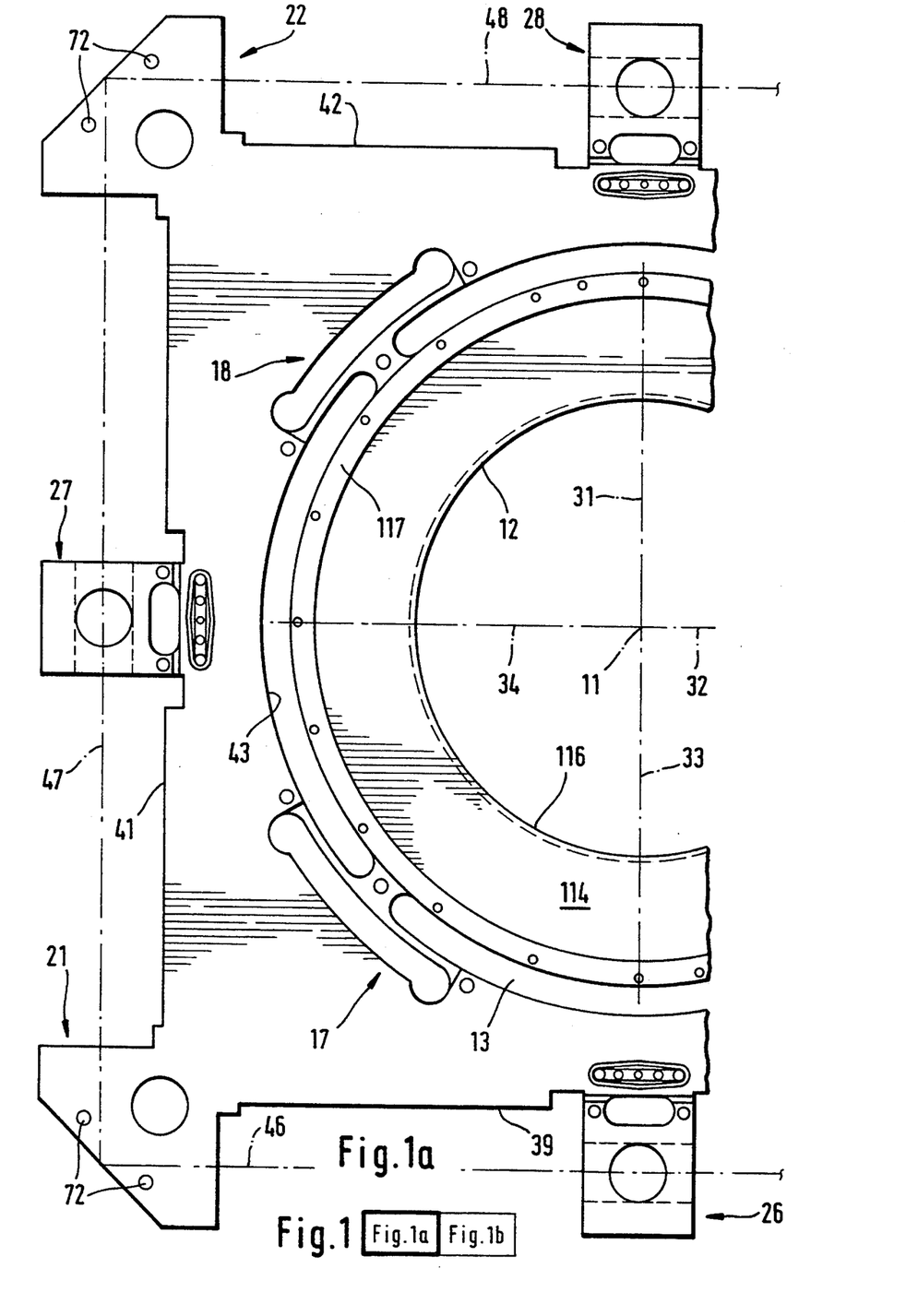
Figure 1B:
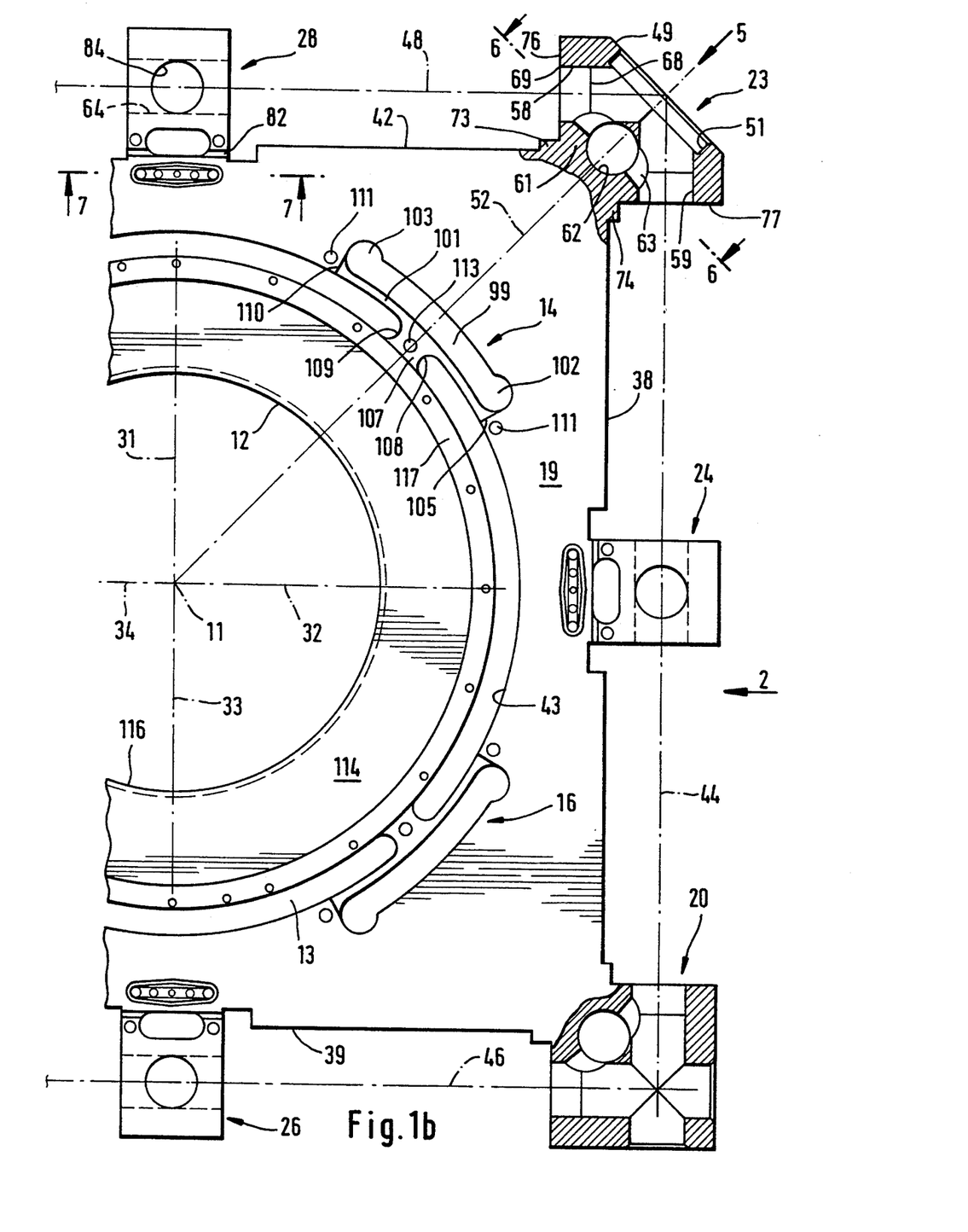
Figure 2:
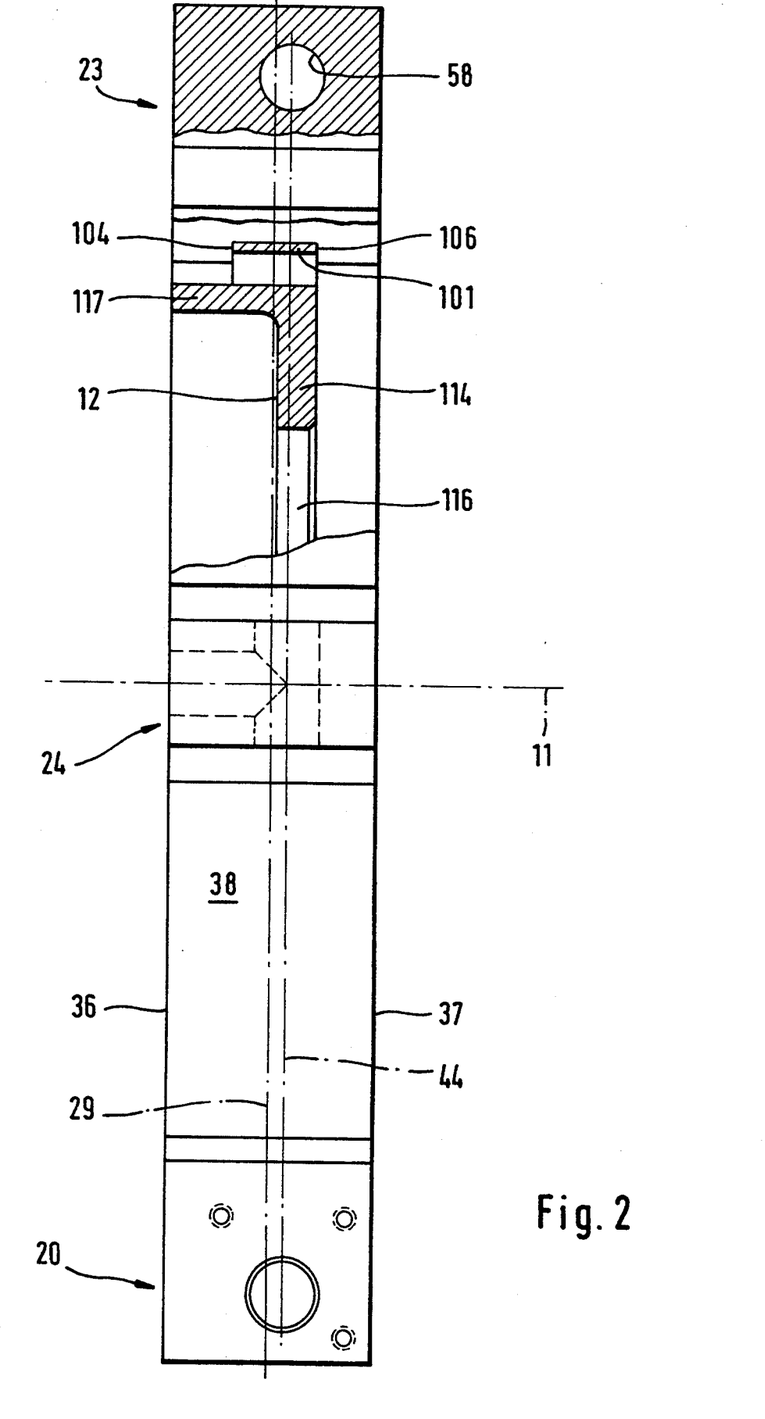
FIG. 2 shows a view along the arrow 2 in FIG. 1, partially cut away.
Figures 3, 3A:
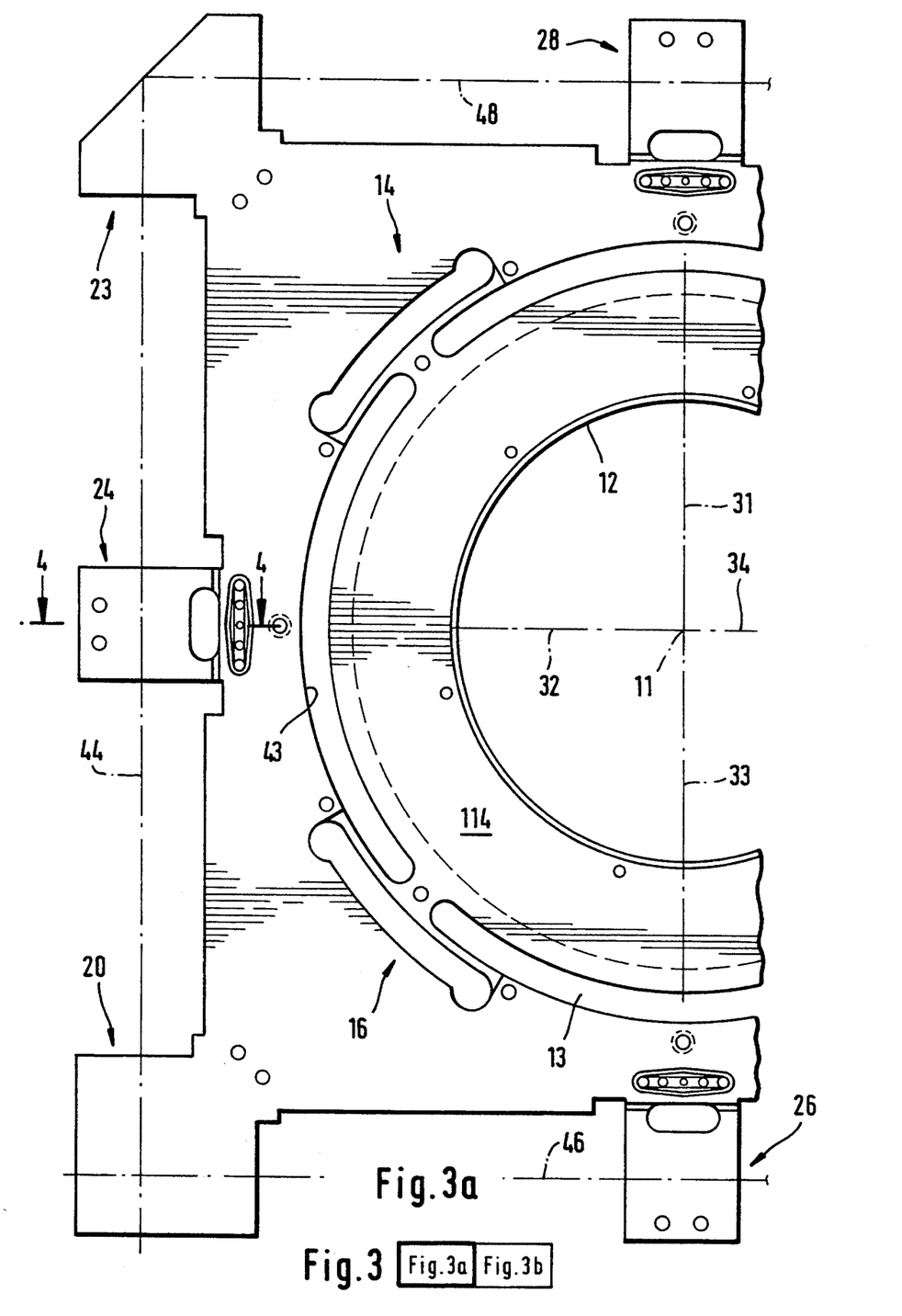
Figure 3B:
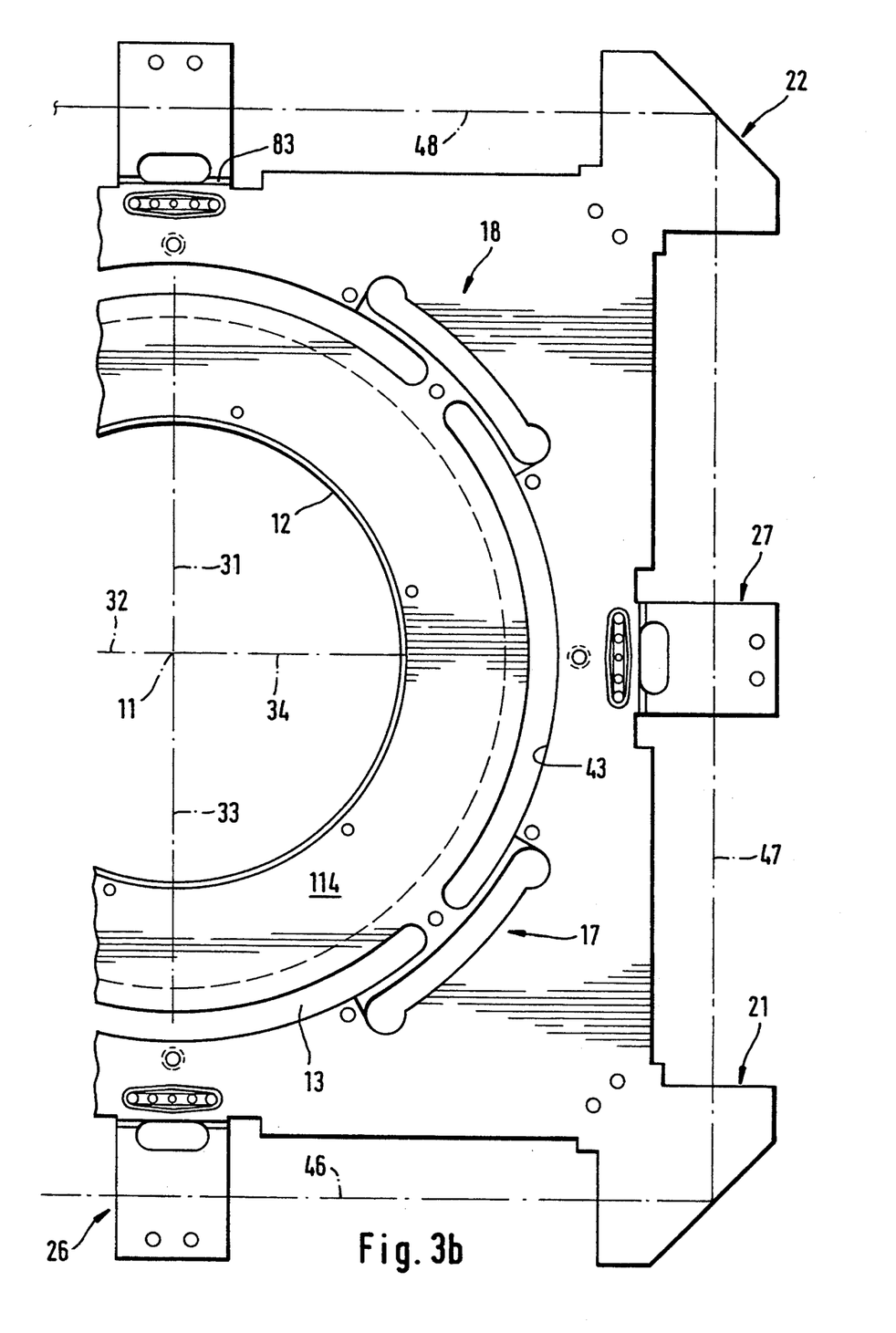
Figure 4:
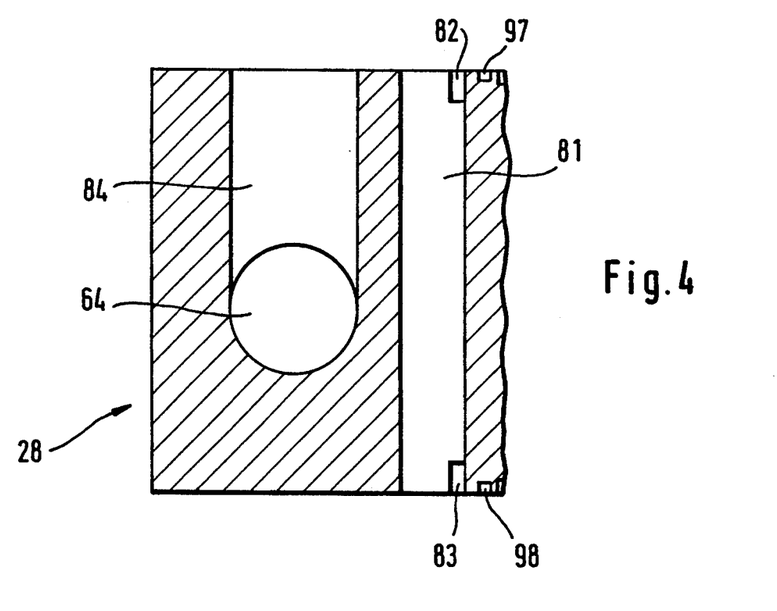
FIG. 4 shows a section along the line 4/4 in FIG. 1.

According to FIGS. 1 and 3, a geometrical mid-axis stands perpendicularly to the plane of the drawing, and a flange 12, an annular groove 13, four coupling elements 14, 16, 17, 18, mirror blocks 19, 21, 22, 23 and intermediate blocks 24, 26, 27, 28 have a distinct geometrical position in relation to it which can be read from the drawing. In particular, according to FIG. 2, the arrangement also has a geometric midplane 29. This runs parallel to the plane of the drawing of FIGS. 1 and 3. The intermediate blocks 24, 26, 27, 28 lie exactly symmetrically to a zero-degree plane 31, a 90-degree plane 32, a 180-degree plane 33 and a 270-degree plane 34. The mirror block 20 and the coupling element 14 lie symmetrically of the bisectors of angles (not shown) present here; likewise, the mirror block 21 and the coupling element 16; the mirror block 22 and the coupling element 17; and the mirror block 23 and the coupling element 18. The upper side 36 and the lower side 37 are mutually parallel and parallel to the midplane 29. No part of the monolith projects out over the upper side 36 and the lower side 37. The optical bench 19 is outwardly bounded by four external faces 38, 39, 41, 42, which are planar, stand at right angles to the midplane 29, and undergo only the interruptions visible from the drawing and described below. The optical bench is inwardly bounded by a cylindrical wall 43, which is coaxial with the geometrical mid-axis 11 and runs equally far upwards as downwards, perpendicular to the midplane 29, which is also the case for the external faces 38-42. Four dot-dash lines 44, 46, 47, 48 indicate where the middle of the laser beam later runs during operation, and these lines are likewise lines which have to be strictly observed during production, described below.

There will now be described, with reference to the right-hand upper region of FIG. 1, a single time, how the high-precision configuration is obtained. The processes are repeated essentially the same at all four corners together with the associated intermediate blocks, i.e. accordingly, also at the mirror block 20, which in fact accommodates an end mirror and an output mirror.

Figure 5:
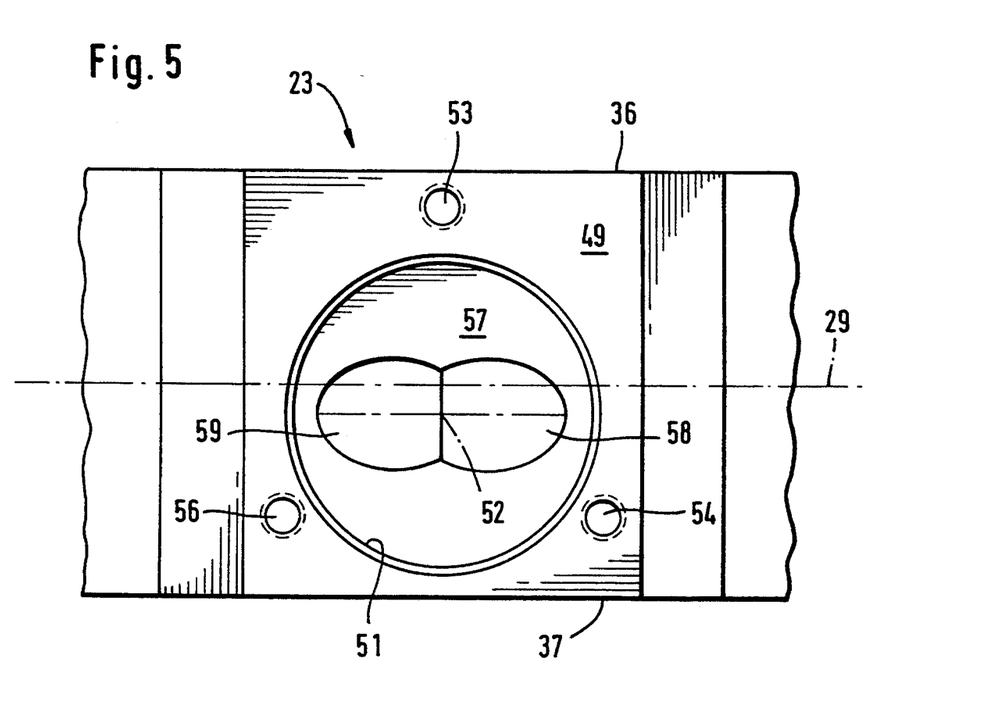
FIG. 5 shows a view along the arrow 5 in FIG. 1.
Figure 6:
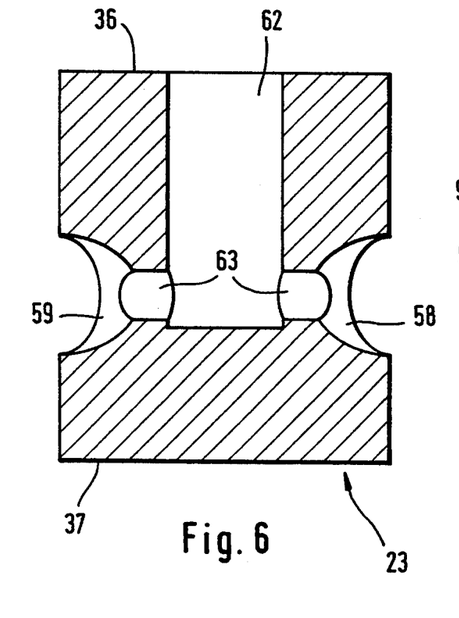
FIG. 6 shows a section along the line 6/6 in FIG. 1.
Figure 7:
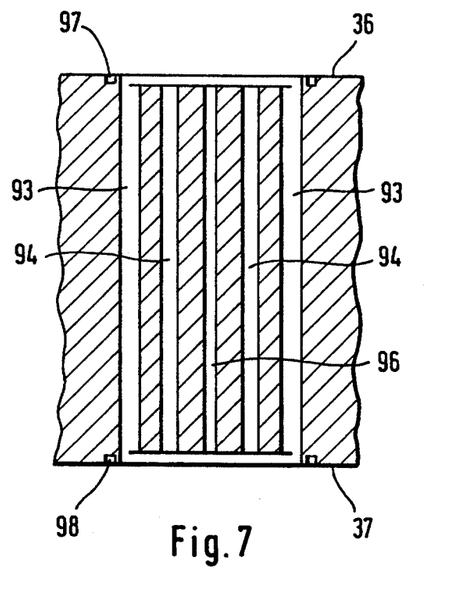
FIG. 7 shows a section along the line 7/7 in FIG. 1.
Figure 8:
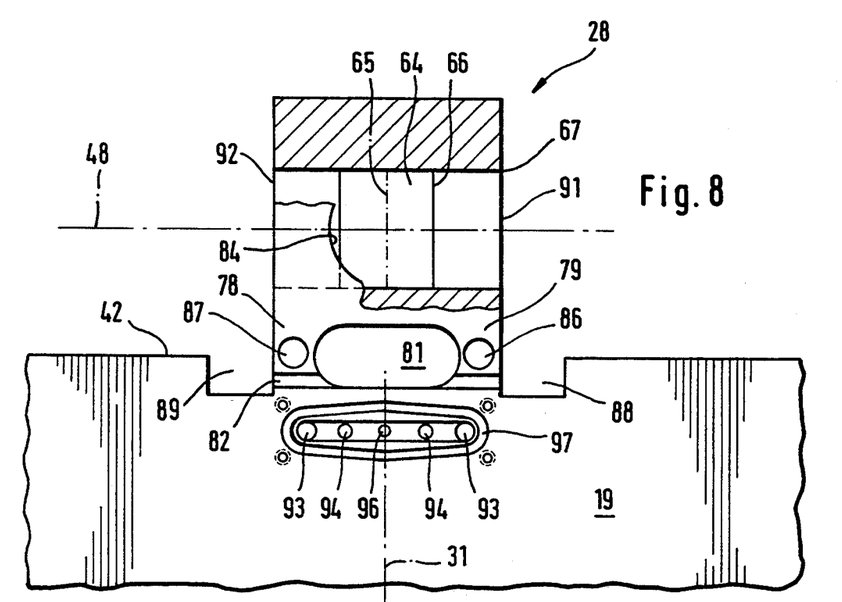
FIG. 8 shows the cut-away top view of a broken off intermediate block.

The mirror block 23 has an external surface 49 at right angles to the angle bisector and having a flat blind hole bore 51, which itself is perpendicular to the angular bisector 52, let into it. A 45-degree deflector mirror later lies in this blind hole bore 51. As can be seen in FIG. 5, the blind hole bore 51 is offset downwards relative to the midplane 29. Thus it still has sufficient material between the upper edge region of the blind hole bore 51 and the upper side 36 of a threaded bushing 53, as do the two threaded bushings 54 and 56 which lie right and left below it and which are pressed into the aluminum material of the whole apparatus. Thus there arises, according to the drawing, an isosceles, nearly equilateral triangle, the center of gravity of which lies on the angle bisector 52. There open into the floor of the blind hole bore 51, on the one hand the circular-cylindrical bore 58 and the circular-cylindrical bore 59 in the form of ellipses which intersect in a plane passing through the angle bisector 52 and standing perpendicular to the midplane 29. A corner region 61 thus remains on the inner side, between the bores 58, 59. This is however drilled through from above, lying on the angle bisector, by a gas supply bore 62 which is formed as a blind hole and reaches in FIG. 5 about as far as the connecting line between 54 and 56. This bore 62 is then cut at the bottom by a cross-bore 63, which stands perpendicular to the angle bisector 52, and the exit line of which, for the sake of simplicity, is however not shown in FIG. 5. The cooled gas therefore arrives via the bore 62 to the crossbore 63, which divides the gas right and left into the bores 58 and 59, to then reach the gas conduits which consist of quartz and are not shown. The region of the mirror then remains free from impingement of gas.

The square intermediate block 28 has a through bore 64 coaxial with the line 48, with which the bore 58 is also coaxial. During production, with the position of the monolith in the machining center remaining constant, the bore 58, of 35 mm diameter, is drilled first, with the mid-axis of the drill lying in the line 48. This drill is then removed, a drill of 34 mm diameter is inserted, and the bore 64 is drilled through the bore 58 of one millimeter greater diameter, but only to the middle 66, i.e., only half the length of the through bore 64. The 34-mm drill is then also removed, and tool for turning a step is inserted, with the position of the monolith and of the chuck of the machining center still remaining the same. This tool has a front diameter of 34.7 mm for the through bore 64 and a diameter of 35.7 mm for the bore 58.

This step-turning tool is then also removed, and instead of it, always in the same configuration, a step reamer is used, which reams the through bore 64 to the measurement 35$h$7 [sic] and the bore 58 to the measurement 36$h$7 [sic]. However, not the whole length of the half of the through bore 64 is reamed. Rather, only a peripheral region as far as the boundary mark 66, which lies about 20 mm inwards from the right-hand aperture 67 of the through bore 64. The region between the boundary mark 66 and the zero-degree plane 31 remains at the unreamed measurement of 35.7.

The bore 58 is also now reamed as far as the boundary mark 68, which likewise lies about 20 mm inwards from the aperture 69. Since the bore 58 always has a greater diameter than the through bore 64, nothing happens to the periphery of the bore 58, whether due to the tools themselves, or due to chips or any other influences. The tools receive no noticeable impact when they are made to travel out towards the right along the line 48.

The monolith is then turned through 90° in the machining center and the mirror block 22 is worked on in the same manner. The through bores in the intermediate blocks 24, 26, 27, 28 are thus at first made only as far as half of their depth, but are finished. The tools are preferably guided with guide bushings in front of the intermediate blocks for this. Since the production has been very precisely described in this regard, a further description of the other machining locations is superfluous.

The mirror blocks 20–23 have cooling bores 72. Each corner region is so thick that the mirror blocks are firmly connected to the bench 19. In order to increase this connection to the base still further, side struts 73, 74 are provided, integral with the monolith and effecting a widening at the root. The surfaces 76, 77, which flank the bores 58, 59, are perpendicular to each other, to the midplane 29, and to respective pairs of the lines 44, 46, 47, 48. As for the rest, the form can be clearly gathered from the drawing.

The intermediate block 28 (and also the others in an exactly similar manner) is connected to the bench 19 by two bottom strips 78, 79, which originate by the machining of a slotted hole 81 into the foot region, perpendicular to the zero-degree plane 31. The two bottom strips 78, 79 are as high as the bench is thick, i.e., 114 mm. Other measurements can be measured from the scale drawing according to this measurement. However, a parting groove 82 is formed from above, and a parting groove 83 is formed from below, aligned with the inner wall of the slotted hole 81, both of the same depth, namely about 5 mm; the intermediate block 28 is, again, thermally uncoupled from the bench by them. In spite of this segmentation, enough surface is left on the bench 19 to make possible an accurate machining of the intermediate block 28. The gas heated to 300° C. in fact gets into it on both sides, and is sucked out upwards through an exhaust bore 84.

The bottom strips 78, 79 are cooled in that cooling bores 86, 87 are formed in them perpendicularly from above. Thus at this narrowest point, cooling takes place, and also the thermal resistance is increased, by the cooling bores 86, 87.

A further thermal uncoupling consists of two further parting grooves 88, 89, which are formed in the outer surface 42 over the whole height, directly bordering on the end faces 91, 92 of the intermediate block 28. The parting grooves 82, 83 also open into these end faces 91, 92.

A still further measure for increasing the heat transfer resistance and for cooling consists in that an arrangement of two external through bores 93, two middle through bores 94 and a middle through bore 96 is provided in the bench 19, perpendicular to the zero-degree plane 31 and at a small spacing from the bottom strips 78, 79; the said through bores can all have cooling water passed through them. Their openings are surrounded by an approximately oval groove 97, 98, in which a sealing O-ring lies after mounting is finished, so that a feed funnel or drain funnel can be attached to the arrangement. Because of the central water feed through a flexible tube, the water would preferably flow into the middle. This is assisted in that the through bore 96 has the smallest diameter, the through bore 94 a somewhat greater diameter, and the through bore 93 a still greater diameter.

As is shown by a comparison of the Figures, there are extraordinarily many surfaces, grooves, bores, etc. at right angles to the midplane 29, so that here in the ideal case machining can take place even only with a single clamping, which leads both to precision and to a reduction of costs.

Since the coupling elements 14, 16, 17, 18 are of the same form, for simplification only the coupling element 14 will be more precisely described.

A groove 99, of circular sector shape, is machined from above to below in the bench 19, symmetrically to the angle bisector 52, and is offset inwards to an extent such that a leaf spring 101 remains between the wall 43 and the groove 99 and correspondingly also runs on a circular sector. The ends of the groove 99 form bores 102, 103, which are larger than the width of the groove 99, so that first drilling and then milling can take place. Moreover, the bores 102, 103 give a smooth transition into the bench 19 at the end of the leaf spring 101. The leaf spring 101 has an upper end face 104 and a lower end face 106, which are considerably set back inwards with respect to the upper side 36 or the underside 37. However, the end faces 104, 106 are distant from the midplane 29 by an equal distance, so that the leaf spring 101 is symmetrical to this with respect to height. The trough can be seen at the two marks 107, 108 in FIG. 1. The leaf spring 101 takes up about a third of the height of the monolith.

The annular groove 13 is interrupted a total of four times. A bridge 107 thus results between the leaf spring 101 and the flange 12, and in fact exactly in the middle of the leaf spring 101. Since the annular groove 13 is produced by a mortise miller, smooth transition curves 108, 109 automatically arise. Cooling bores 111 are provided at the ends of the leaf spring 101, so that heat can be carried away there also. A cooling bore 113 is provided in the bridge 107.

The flange 112 has a floor 114 which extends parallel to the midplane 29. It has a large, concentric, circular hole 116; externally it has an edge 117 which reaches to, and is aligned with, the top side 36 (FIG. 9). A fan 118 has a shim ring 119 which fits in the hole 116, and below it an annular flange 121 which projects out beyond the hole 116 and is there screwed from below, in a manner not shown, to the floor 114. The fan 118 has a rotor 122. An upper cover 126 is screwed to the edge 117 by means of threaded bores 123 and screws 124, has gas guide holes 127, 128, and furthermore has a circular annular channel space 129 coaxial with the mid-axis 11. A lower cover 131 is screwed from below against the upper cover 126, and is spaced on all sides from the flange 12 and likewise with its gas duct piece 132 from the rotor 122 and the channel space 129. The flange 12 is thus also partially a portion of the fan 118 and also guides the gas whose intake is according to the dot-dash line 133 and which is ejected again in the direction of the arrow.

The monolith described in FIGS. 1–8 is of sea water resistant aluminum which contains no lead.

What is claimed is:

1. Apparatus for a power laser of polygonal configuration,
   with mirror blocks in the corner regions, which mirror blocks have an essentially monolithic body,
   with intermediate blocks in the straight paths between the mirror blocks, which intermediate blocks have an essentially monolithic body,
   with at least one straight partial bore in each mirror block, with a respective through bore in each intermediate block, the mirror blocks and the intermediate blocks being fine-machined for the gas-tight and centered mounting of laser tubes, and also with an optical bench having corresponding corners, which carries the mirror blocks and the intermediate blocks on its periphery,
   characterized by the following features:
   (a) the optical bench is solid and monolithic,
   (b) the mirror blocks and intermediate blocks are at least in their majority connected in a mechanically rigid manner to the optical bench, so that they do not permanently deform relative to the bench during chip-removing machining processes, at least during fine machining processes on the mirror blocks.

2. Apparatus for a power laser according to claim 1, characterized in that the optical bench is machined from the solid.

3. Apparatus for a power laser according to claim 1, characterized in that the optical bench is made of an aluminum alloy.

4. Apparatus for a power laser according to claim 1, characterized in that the optical bench is made of an alloy resistant to sea water.

5. Apparatus for a power laser according to claim 2, characterized in that it is made of brass.

6. Apparatus for a power laser according to claim 2, characterized in that it is made of concrete polymer.

7. Apparatus for a power laser according to claim 2, characterized in that at least one of the blocks is machined from the solid together with the bench.

8. Apparatus for a power laser according to claim 7, characterized in that the mirror blocks are machined from the solid together with the bench.

9. Apparatus for a power laser according to claim 7 or 8, characterized in that the intermediate blocks are machined from the solid together with the bench.

10. Apparatus for a power laser according to claim 1, characterized in that at least a few of the blocks are at least of essentially the same height as the thickness of the bench.

11. Apparatus for a power laser according to claim 1, characterized in that the laser segment is parallel to, and offset from the midplane of the apparatus by the same measurement as is necessary to give sufficient surrounding material for one of two mirror fastening threads in the mirror blocks.

12. Apparatus for a power laser according to claim 1, characterized in that the thread is the inner thread of a pressed-in threaded bushing which is of a harder and/or tougher material than the mirror block material.

13. Apparatus for a power laser according to claim 1, characterized in that at least a few of the blocks are of at least essentially the same material as the bench.

14. Apparatus for a power laser according to claim 1, characterized in that the partial bores and the through bores are first drilled together, with a dimension smaller than specified.

15. Apparatus for a power laser according to claim 1 or 14, characterized in that the partial bores and the end bores are drilled out together.

16. Apparatus for a power laser according to claim 1, characterized in that the partial bore and the through bores are fine-machined in the same apparatus clamping position.

17. Apparatus for a power laser according to claim 16, characterized in that the partial bores and through bores are fine machined only in the end region, essentially where the sealing device of the mounting has its sealing face.

18. Apparatus for a power laser according to claim 16, characterized in that the partial bores and the end bores are fine machined with a step reamer.

19. Apparatus for a power laser according to claim 1, characterized in that the through bores have a smaller diameter than the partial bores, at least after the fine machining processes.

20. Apparatus for a power laser according to claim 1, characterized in that each half of the through bores is machined out from the adjacent partial bore.

21. Apparatus for a power laser according to claim 1, characterized in that the intermediate blocks are connected with at least one bottom strip to the optical bench, which bottom strip has a substantially smaller cross section than the intermediate block at the face seen in the direction of the midplane, and that at least one cooling device is provided in the heat transfer region between the bottom strip and the bench.

22. Apparatus for a power laser according to claim 21, characterized in that a cooling bore is provided in the bottom strip itself.

23. Apparatus for a power laser according to claim 21, characterized in that a cooling bore arrangement is provided in the region of the transition from the bottom strip to the optical bench.

24. Apparatus for a power laser according to claim 23, characterized in that the cooling bore arrangement includes several parallel individual bores.

25. Apparatus for a power laser according to claim 24, characterized in that the individual bores are connected to a common distributor volume.

26. Apparatus for a power laser according to claim 25, characterized in that the individual bores have different diameters, to improve of the equalization of the flow resistance paths.

27. Apparatus for a power laser according to claim 1, characterized in that notches which increase the heat transfer to the optical bench are located on both sides of the intermediate blocks.

28. Apparatus for a power laser according to claim 1, characterized in that a cooling fan flange for a coaxial cooling fan (gas circulation appliance) is inscribed in the bench, and that weight-rigid [sic] elastic coupling elements are provided between the bench and the flange.

29. Apparatus for a power laser according to claim 28, characterized in that the coupling elements are springs which are substantially weaker in the direction parallel to the midplane than perpendicular thereto.

30. Apparatus for a power laser according to claim 29, characterized in that the coupling elements are leaf springs.

31. Apparatus for a power laser according to claim 28, characterized in that the number of coupling elements corresponds to the number of corners.

32. Apparatus for a power laser according to claim 28, characterized in that four coupling elements are provided.

33. Apparatus for a power laser according to claim 28, characterized in that the coupling elements lie in the region of the diametral connecting line of the mirror blocks.

34. Apparatus for a power laser according to claim 28, characterized in that the ends of the coupling elements are connected to the optical bench.

35. Apparatus for a power laser according to claim 28, characterized in that the middle regions of the coupling elements are connected to the flange.

36. Apparatus for a power laser according to claim 28, characterized in that the coupling elements are machined out integrally from the material between the bench and the flange.

37. Apparatus for a power laser according to claim 28, characterized in that the coupling elements extend concentric to a geometric axis which is perpendicular to the geometric midplane and intersects the diagonals between the mirror blocks.

38. Apparatus for a power laser according to claim 28, characterized in that the flange is separated from the bench by an annular groove, with the exception of the regions determined by the coupling elements.

39. Apparatus for a power laser according to claim 28, characterized in that the coupling elements are arranged centrally to the geometric midplane.

40. Apparatus for a power laser according to claim 1, characterized in that the mirror blocks and/or intermediate blocks and/or optical bench are machined out of a coherent large piece.

41. Apparatus for a power laser according to claim 1, characterized in that the laser path lies essentially in the midplane of the apparatus.

42. Apparatus for a power laser according to claim 1, characterized in that at least the end region of a partial bore is produced with at least the following end region of the following through bore at least during the fine machining in the same apparatus clamping position.

43. Apparatus for a power laser according to claim 15, characterized in that the partial bore and the through bores are fine-machined in the same apparatus clamping position.

* * * * *